United States Patent [19]
McCourty et al.

[11] 3,909,226
[45] Sept. 30, 1975

[54] CUTTING GLASS

[75] Inventors: Ian Alexander McCourty, Wigan; Howard Wood McKenzie, Southport; Philip James Oakland, Liverpool, all of England

[73] Assignee: Pilkington Brothers Limited, St. Helens, England

[22] Filed: Sept. 19, 1973

[21] Appl. No.: 398,904

[30] Foreign Application Priority Data
Sept. 20, 1972  United Kingdom............... 43621/72

[52] U.S. Cl. .................. 65/97; 65/105; 65/112; 65/176
[51] Int. Cl.² ........................................ C03B 21/02
[58] Field of Search ....... 65/70, 105, 112, 113, 175, 65/176, 97

[56] References Cited
UNITED STATES PATENTS
3,278,287  10/1966  Leflet, Jr. et al. ................. 65/105 x
3,344,968  10/1967  Kovacik et al. ......................... 225/2

*Primary Examiner*—Arthur D. Kellogg
*Attorney, Agent, or Firm*—Sughrue, Rothwell, Mion, Zinn & Macpeak

[57] ABSTRACT

A method of cutting an elongated strip of glass comprises modifying the stress pattern in the strip region by treating the glass to form in the glass a line of tensile stress along the strip between a cutting line and the edge of the ribbon or sheet, and the further step after modifying the stress pattern of causing the glass to fracture along the cutting line while the modified stress pattern still exists. Preferably a line of compressive stress is formed along the cutting line.

16 Claims, 16 Drawing Figures

CUTTING GLASS

BACKGROUND OF THE INVENTION

The invention relates to cutting glass and in particular to cutting elongated strips from flat glass in ribbon or sheet form.

It is common practice in cutting glass to score along a required cutting line and apply a bending moment across the score line to snap the glass. For many purposes the quality of the cut edge is important and any defects occurring in the cut edge may render the cut glass unsuitable for its intended purpose. It is known that problems in achieving a good quality of cut more frequently occur when cutting elongated strips, such as unwanted selvedge portions, from glass.

When glass is formed in sheet or ribbon form, a residual stress pattern is set up in the glass, the stress varying across the width of the ribbon or sheet. It is normal to find residual compressive stresses towards the edges of the ribbon or sheet while net tensile stresses normally exist in the central region of the sheet. When a strip or selvedge portion is cut off such a sheet or ribbon, the selvedge distorts on being separated from the main sheet until the redistributed stresses in the selvedge are balanced. This is a particular problem with elongated strip portions, such as selvedges, as the physical size of the cut off portion is inadequate to withstand the effect of residual stresses without distortion occuring to redistribute the stresses. When cutting larger portions, such as centre splitting of sheets, the size of the two cut parts is generally sufficient to withstand the stress without distortion.

Owing to the distortion of the selvedge as the score is being opened, edge damage is caused and in more severe cases, the selvedge can tear itself away from the main glass sheet or ribbon and fragment.

It is an object of the present invention to modify the stress distribution in an elongated strip region prior to cutting so as to improve the edge quality of subsequent cutting.

SUMMARY OF THE INVENTION

The invention provides a method of cutting an elongated strip, such as a selvedge, from flat glass in ribbon or sheet form, which method comprises modifying the stress pattern in the strip region by treating the glass to form in the glass a line of tensile stress along the strip between a cutting line and the edge of the ribbon or sheet, and the further step after modifying the stress pattern of causing the glass to fracture along the cutting line while the modified stress pattern still exists.

It has been found that the provision of a line of tensile stress along the elongated strip region tends to balance the compressive stresses normally found in the edge region. If the tensile stress so introduced balances the compressive stresses in the cut off strip, then no distortion of the selvedge occurs when the edge is removed. The modified stress pattern is such that the stress curve passes into compression between said line of tensile stress and the cutting line.

Preferably the step of modifying the stress pattern includes formation of a line of compressive stress along the cutting line.

Glass will fracture more readily along a score line if the glass is under compressive forces along the line. Furthermore, the presence of compression adjacent the cutting line will normally cause a more symmetrical distribution of stress within the elongated strip if, as is usual, the line of tensil stress is also bounded by a line of compressive stress adjacent the extreme edge of the sheet or ribbon.

Preferably the compressive and tensile stresses are such that the energy stored in the strip due to compressive stresses is substantially balanced by the energy stored in the strip due to tensile stresses. Such a balanced stress situation reduces to a minimum the likelihood of redistribution of the stresses and a related selvedge distortion.

Preferably the line of compressive stress is formed with the maximum compressive stress substantially coincident with the cutting line. Preferably the compressive stress is distributed substantially symmetrically on each side of the cutting line.

As the stress redistribution is carried out as a preliminary step before causing the glass to fracture along the cutting line, it may be convenient in some cases to preprepare glass sheets with the appropriate stress redistribution permanently introduced which are then stored under conditions which allow the stress pattern to be maintained until cutting is subsequently required.

DESCRIPTION OF THE PREFERRED EMBODIMENTS

All the embodiments described concern the modification of stress distribution in the edge regions of glass ribbon or sheet prior to cutting off the edge region in the form of an elongated strip. They are particularly concerned with the removal of selvedge portions. Throughout the description it is the area stress distribution which is referred to rather than the stress distribution through the thickness of the sheet or ribbon.

Figure 1:
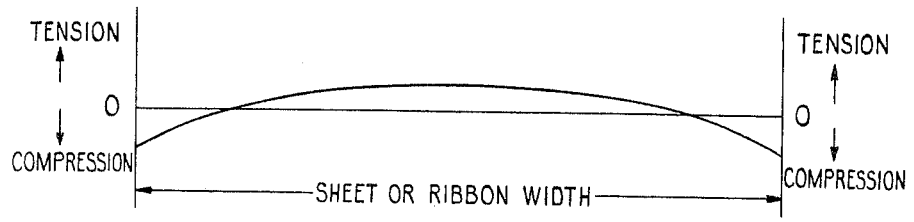
FIG. 1 shows the stress distribution across the width of a conventional glass sheet.
Figure 2:
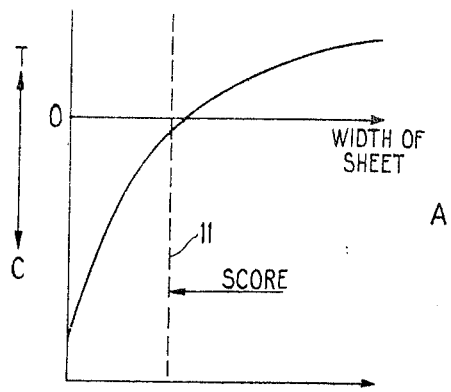
FIG. 2 shows a high compressive stress gradient at the edge of a conventional sheet.

Normal manufacturing processes for glass sheet or ribbon involve annealing the sheet or ribbon and FIG. 1 shows a characteristic area stress distribution across the width of a glass sheet or ribbon after annealing. As is shown, the central region of the sheet is in tension whereas compressive stresses exist in the two opposite edge regions of the sheet. In all examples of the present invention, the stress pattern, an example of which is shown in FIG. 1, is modified prior to cutting off an edge strip by introducing a line of tensile stress along the strip to be cut off. This is in a region which would normally have compressive stress. The effect of the tension peak in the selvedge portion is to reduce the compression on the extreme edge and to make the overall selvedge stresses more balanced thus avoiding distortion of the selvedge as it is being removed from the main sheet. This can be seen with reference to FIGS. 2 to 7. FIG. 2 shows the area stress distribution towards the edge of a sheet which has not been modified in accordance with the present invention. It will be seen that a steep compressive stress gradient exists across the width of the selvedge portion which lies to the left of a score line marked 11. The stress across the full width of the selvedge is compressive and varies considerably from one edge of the selvedge to the other. When the glass is cut along the score line 11, the unbalanced stresses within the selvedge distort the selvedge considerably on removal until the redistributed selvedge stresses are balanced. This can be seen from FIG. 3 which shows the selvedge strip 12 which has become curved on separation from the main sheet. The redistributed stress is shown by the curve 13 which has a tension peak 14 counter-balancing the compressive stresses indicated below the zero line 15. As the selvedge shown in FIG. 3 will have distorted when the score was being opened, a poor quality of cut edge will result.

Figure 3:
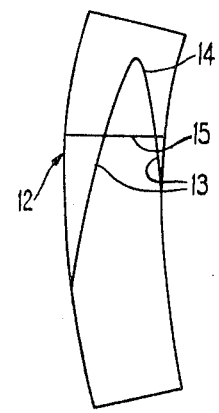
FIG. 3 shows schematically distortion and stress distribution when cutting the sheet of FIG. 2.
Figure 4:
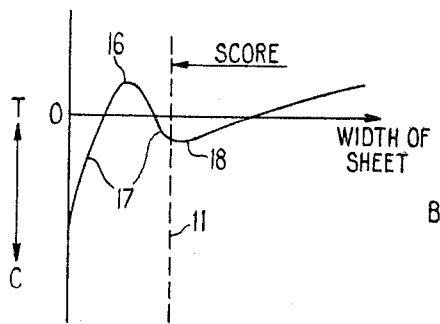
FIG. 4 shows the stress pattern at the edge of a sheet treated in accordance with the present invention.
Figure 5:
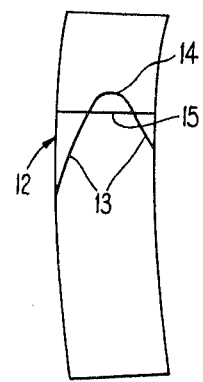
FIG. 5 shows schematically stress redistribution and reduced distortion when cutting the sheet of FIG. 4.
Figure 6:
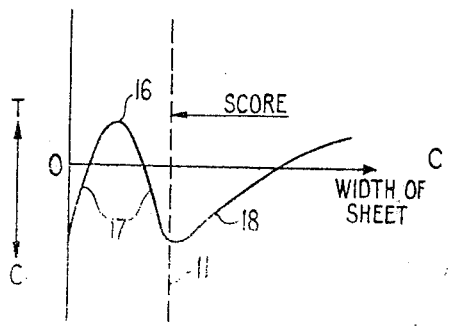
FIG. 6 shows the stress redistribution in the edge of a sheet treated by a preferred process in accordance with the present invention.
Figure 7:
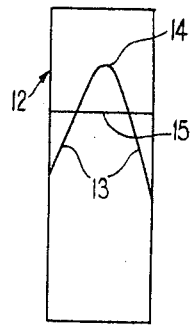
FIG. 7 shows schematically the results of cutting a selvedge from the sheet of FIG. 6.

FIGS. 4 and 5 are generally similar to FIGS. 2 and 3 but show the case where a line of tension has been introduced into the selvedge portion prior to cutting. Similar reference numerals have been used in FIGS. 4 and 5 as in FIGS. 2 and 3. As shown in FIG. 4, a small tension peak 16 is formed along the selvedge strip so that the stresses in the selvedge region are almost balanced. That is the energy stored in the strip due to the tension peak 16 is to a large extent balanced by the energy stored due to compressive stresses indicated by the numeral 17. When the selvedge portion is removed from the sheet, very little redistribution of selvedge stress occurs and only small selvedge distortion takes place. This is shown in FIG. 5 in which the selvedge strip 12 is only slightly curved and the resultant stress distribution within the selvedge is not substantially different from that shown in FIG. 4. In this way, improved edge quality is obtained when cutting off the selvedge in the case shown in FIGS. 4 and 5. The case shown in FIGS. 6 and 7 is a further improvement on that shown in FIGS. 4 and 5 and similar reference numerals have been used. In this case, a larger tension peak is provided in the selvedge strip prior to cutting so that the compressive and tensile forces in the selvedge strip are balanced prior to cutting and consequently no redistribution or stress within the selvedge occurs on cutting. This in turn results in no distortion of the selvedge 12 shown in FIG. 7 and a high quality of cut edge results.

It will be seen from FIGS. 4 and 6 that in each case, the score line overlies a region of compressive stress and preferably lies in a compressive stress trough. This causes the score to open easily with no distortion of the edge as the score opens. It is also preferable, as shown in the examples of FIGS. 4 and 6, for the score line to lie substantially coincident with the maximum compressive stress and in some cases it is preferable that there is a relatively low stress gradient on each side of the score line. In order to achieve uniformity of cut edge along the length of the cut, the tensile and compressive stresses (although shown in the drawings for one section only across the width of the sheet) should be constant along the length of the sheet or ribbon being cut. It will also be seen for both FIGS. 4 and 6 that the peak of the tension curve is spaced from the two sides of the selvedge portion cut off so that the stress curve passes back into compression on both sides of the tension peak within the selvedge portion.

In these examples, the modification of the edge area stress distribution is carried out as a separate step by thermal treatment prior to cutting the glass. The thermal treatment may be applied during annealing and may then include relative cooling along a controlled line to produce compressive stress and/or relative heating (or reduced cooling) along a controlled line to produce tensile stress, and/or may be applied after annealing and may then include relative heating along a controlled line to produce compressive stress, and/or relative cooling along a controlled line to produce tensile stress. The cutting is carried out in conventional manner by scoring along the cutting line and then applying a bending moment across the cutting line to open the score. The scoring may in some cases be carried out before and in others after the step of modifying the stress pattern, but the opening of the score should be carried out while the modified stress pattern exists.

The particular modified stress pattern obtained depends on the thermal treatment used to modify the stress pattern as well as the basic stress pattern which would exist in the particular glass sheet or ribbon if no such modification occurred, this basic stress pattern generally being dictated by the conditions of manufacture and annealing of the particular glass sheet or ribbon. The thermal treatment itself will generally depend in practice on convenience and applicability to the particular type of glass sheet or ribbon with regard to such conditions. Three examples will now be described.

EXAMPLE 1

Figure 8:
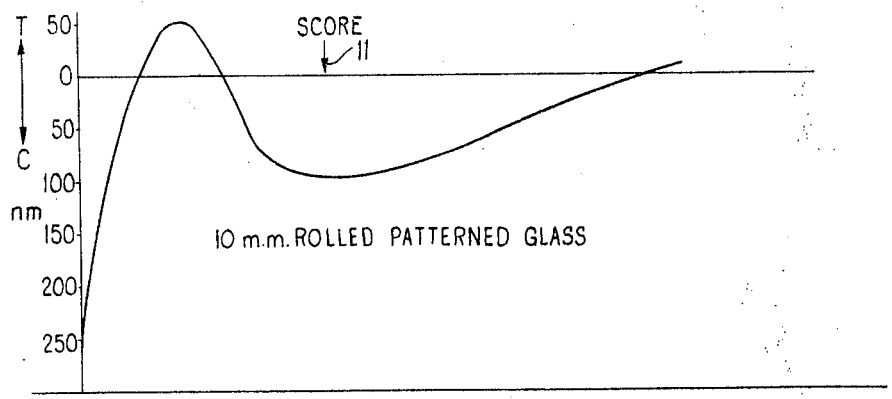
FIG. 8 shows the stress pattern in the edge region of rolled plate glass treated in accordance with the present invention.
Figure 12:
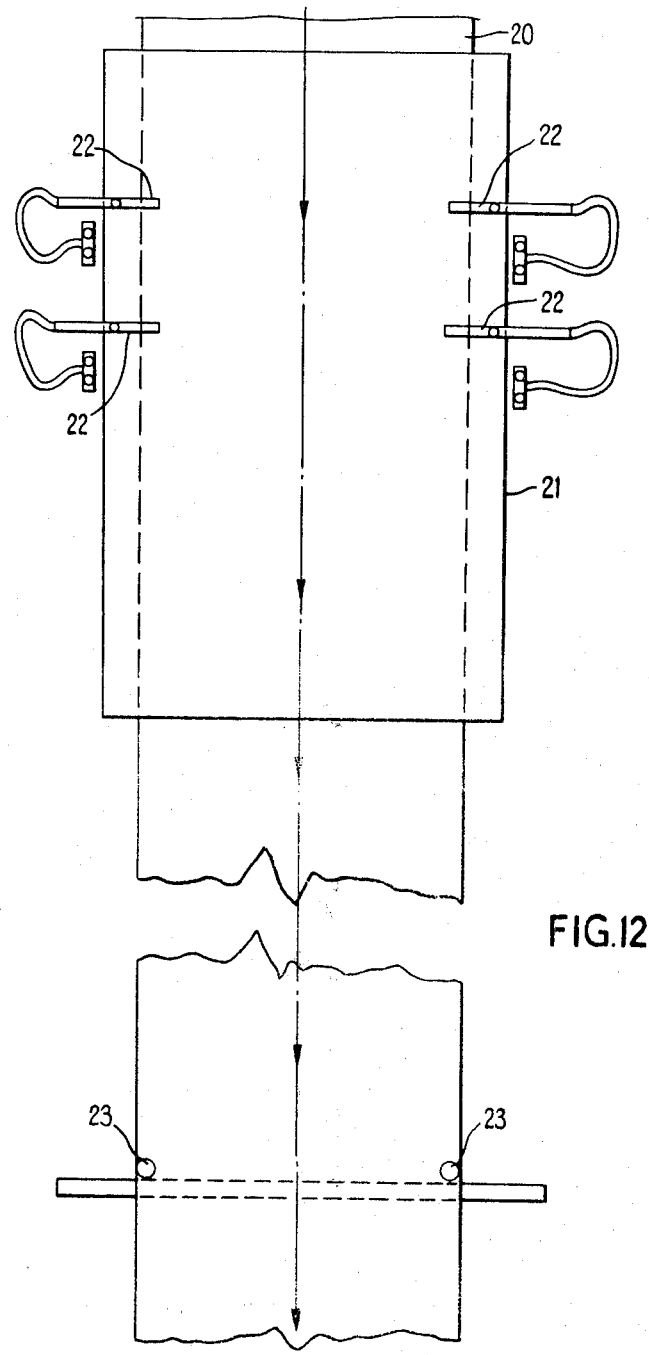
FIG. 12 shows schematically the system for modifying stress in accordance with the present invention in the production of rolled plate glass.
Figure 15:
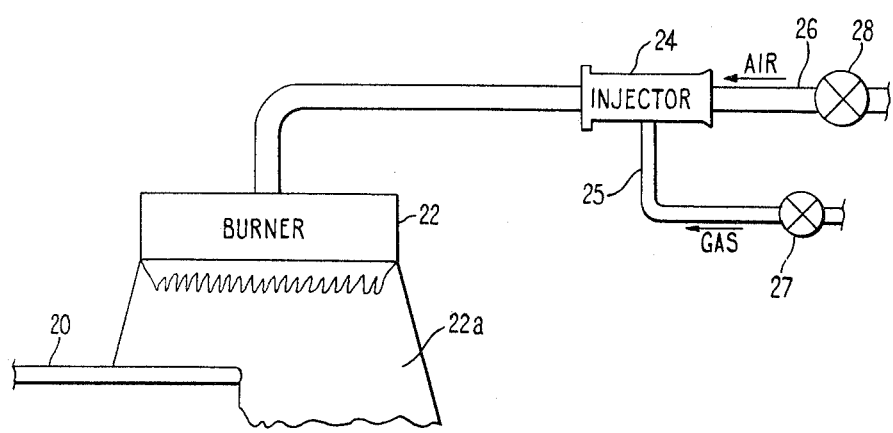
FIG. 15 is a side elevational view of a burner used in the system of FIG. 12.
Figure 16:
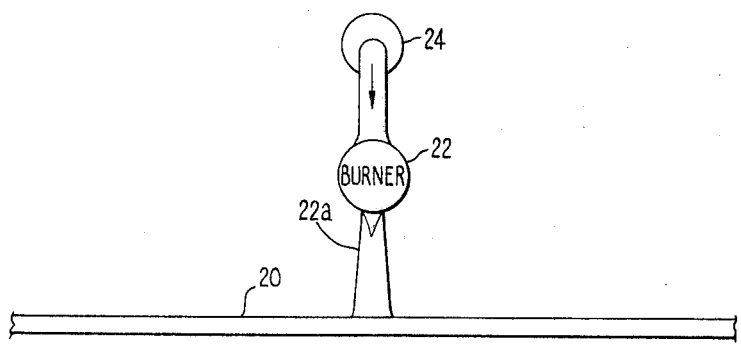
FIG. 16 is a front elevation of the burner shown in FIG. 15.

In this example rolled plate such as for example 10 mm rolled patterned glass is cut in accordance with the present invention. The apparatus for modifying the stress in this case is shown schematically in FIG. 12. A glass ribbon 20 leaving a rolling machine passes through an annealing lehr 21. Two gas burners 22 are located adjacent each edge of the glass ribbon passing through the annealing lehr. One of these burners 22 is shown in FIGS. 15 and 16. The burner is arranged to emit a stable thin ribbon of flame 22a which is applied across the edge region (which may for example be about 50 mms wide) of the ribbon 20 as shown in FIG. 15. A mixture of combustible gas and air is fed to the burner from an injector 24 to which separate gas and air feed pipes 25 and 26 respectively are connected, appropriate valves 27 and 28 being provided in the feed pipe lines. These edge burners in the annealing zone reduce the general level of permanent edge compression in the glass leaving the lehr, i.e. modify the stress pattern during annealing. If the heat input from the burners is sufficiently high then a small selvedge tension peak appears in the selvedge stress distribution. Finer control of the edge stress is achieved by applying water cooling to the edge regions of the ribbon towards the end of the lehr or when leaving the lehr exit at a temperature of approximately 40° to 60°C, i.e., after annealing. This is shown in FIG. 12 schematically by two jets 23 one on each side of the glass ribbon arranged to supply an air/water atomising spray. These sprays cool the outer 50 mms of the ribbon and increase the magnitude of the tension peak and reduce the extreme edge compression. This form of stress modification is of a temporary nature. The resultant stress distribution in this example for 10 mm rolled patterned glass is shown in FIG. 8. The efficiency of the water cooling may be enhanced by cooling the water at near freezing point or using an additive to lower its boiling point and thereby increase its capacity to extract heat. The water cooling, described above as being applied to the edge regions of the rolled plate ribbon, may if preferred be applied to the edge regions of discrete plates cut from the ribbon. A score line is applied by conventional means along each edge region of the glass ribbon or plate before or after the stress pattern has been modified as described. As shown in FIG. 8, the position of the score line 11 is arranged to coincide substantially with the bottom of the compression trough. Although FIG. 8 shows the stress pattern for one side only of the glass ribbon or plate, a similar stress pattern applied at the other side. The score line is then opened up by application of a bending moment. This may be done in conventional manner for example by snapping rollers or known cut running devices. In this way two selvedge portions are removed from opposite sides of the ribbon, or of each plate cut from the ribbon, a high quality of cut edge being achieved.

EXAMPLE 2

Figure 13:
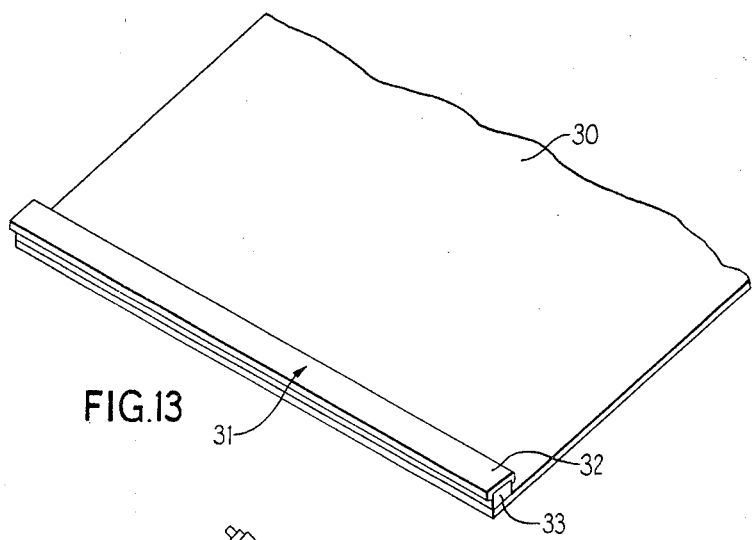
FIGS. 13 and 14 show devices for use in providing the modified stress pattern in accordance with the present invention in float glass.
Figure 14:
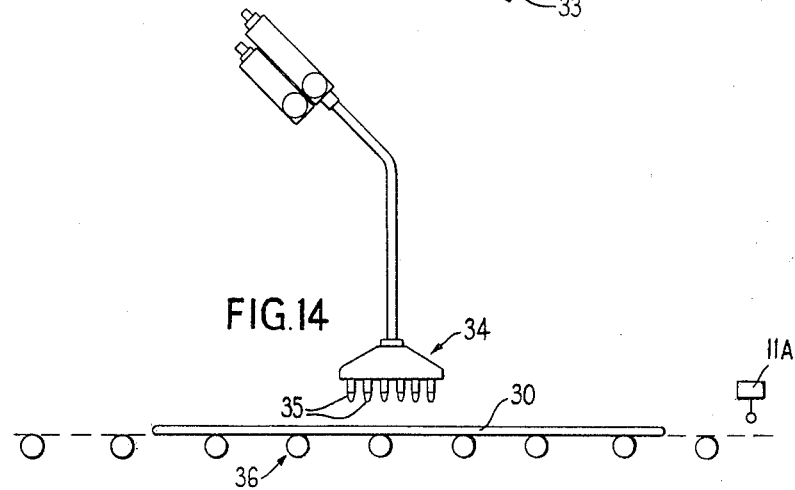
Figure 9:
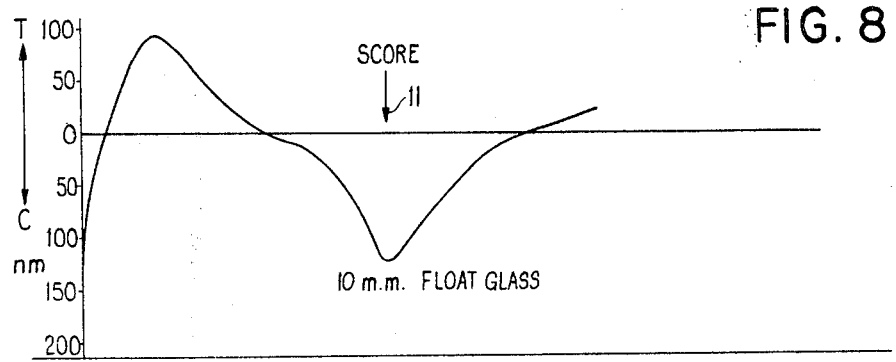
FIG. 9 shows the stress pattern in the edge region of float glass treated in accordance with the present invention.

In this case the invention is applied to float glass. In this case, an annealed ribbon of float glass is cut into discrete lengths and the stress pattern in the edge regions is modified while the plates are in the cold state. The extreme edge compression achieved in normal float plates is considerably reduced and a large tension peak induced in the selvedge regions by use of solid carbon dioxide applied along a two inch wide band at the edge of the plate. This may be done as shown in FIG. 13. A container 31 is packed with solid carbon dioxide and the container overlies the edge region which forms the selvedge portion. The container 31 comprises a hollow tray 33 filled with solid carbon dioxide and covered by a lid 32. As an alternative to a solid cooling medium, a liquid cooling medium, such as for example liquid nitrogen, may be caused to flow through the container 31. Having applied this localised cooling along a strip region, a compression trough is subsequently induced in the region of cutting by use of a hydrogen oxygen flame which heats the glass on the line of cutting. A hydrogen oxygen burner 34 for carrying this out is shown in FIG. 14. The burner has a series of nozzles 35 aligned in a row parallel to the direction of and mounted above the path of glass travel on a conveyor 36. In this way the burners may heat a very narrow region in the glass 30 corresponding to the required line of cut. The stress pattern achieved by this thermal treatment for 10 mm float glass is shown in FIG. 9, from which it will be seen that the line of cutting 11 again coincides with the peak of the compression trough. The glass is then scored along the cutting line 11 by a scoring device 11a located downstream of the burner (as considered in the direction of glass travel) and aligned with the burner. The glass is then fractured along the score line by a three wheel cut running device (not shown) of known form which is located downstream of the scoring device 11a and which applies a bending moment across the score line. It will be appreciated that the same treatment can be applied to both sides of a plate and, two selvedge portions removed therefrom.

EXAMPLE 3

Figure 10:
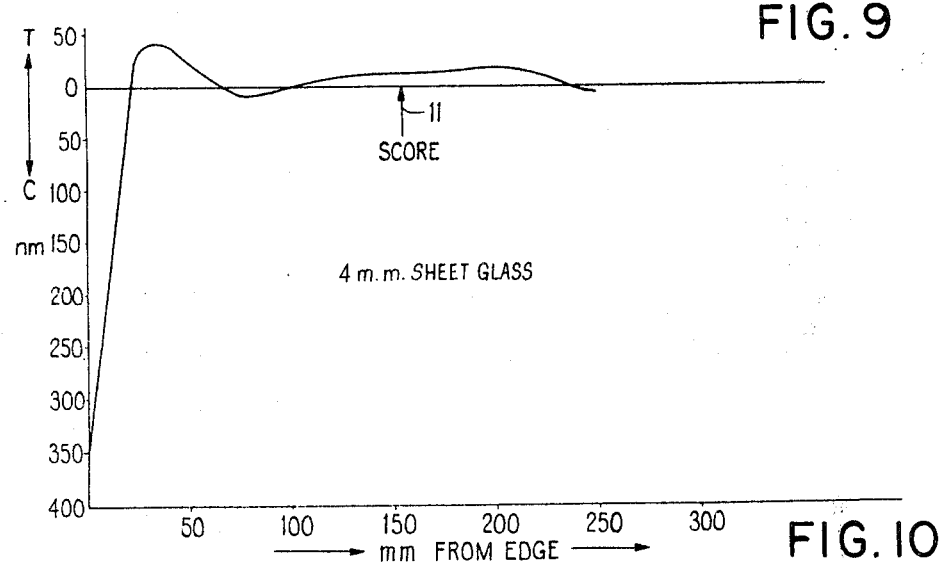
FIG. 10 shows the stress pattern in the edge region of vertically drawn sheet glass treated in accordance with the present invention.
Figure 11:
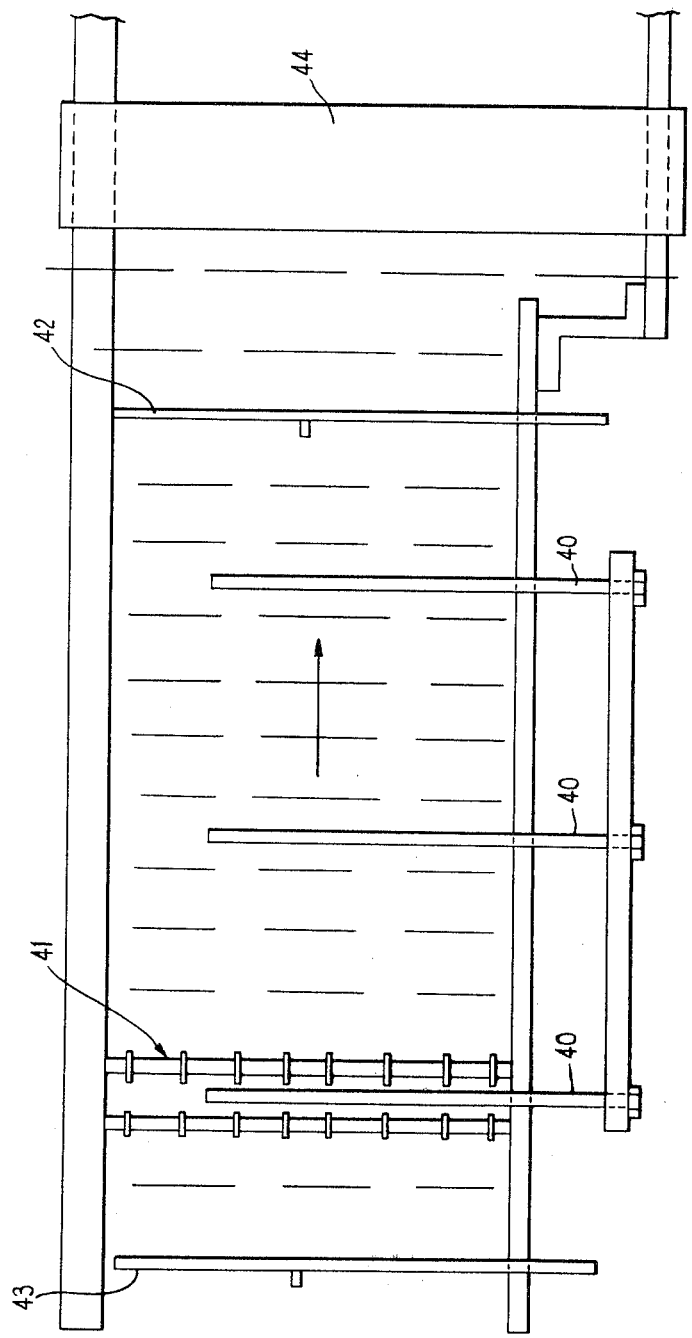
FIG. 11 shows schematically a plan view of apparatus for inducing the modified stress pattern in vertically drawn sheet glass.

In this case the invention is applied to vertically drawn sheet glass. In this case, hot pre-scored sheets taken from the top of the drawing tower are passed to the apparatus shown in FIG. 11. In this case a number of support arms 40 transfer the sheet to a horizontal conveyor 41. The glass at this time has a temperature of approximately 170°C. High selvedge compressive stresses are reduced by blowing cold air onto the sheet approximately one inch in from the extreme edge in the regions where a selvedge portion is to be removed. In the apparatus shown in FIG. 11, the conveyor moves the sheet so that the leading edge of the sheet overlies a perforated tube 42 and the trailing edge of the sheet overlies a perforated tube 43. The conveyor is intermittent in its operation so that the sheet is held stationary over the cooling air tubes for a timed period of up to 30 seconds. The cooling air is then cut off and the sheet moved forward to a conventional snapping unit 44. The sheet already has score lines defining the selvedge portions, these scores having been applied in known manner to the vertically drawn ribbon at the top of the tower. In the snapping unit a bending moment is applied across the leading score line to snap off the leading selvedge strip portion. The trailing selvedge strip portion is similarly snapped off in the snapping unit 44. In this case it is found that the cold air produces a tension peak in the extreme edge and no further stress modification is necessary to facilitate good selvedge removal. The stress pattern achieved by the apparatus of FIG. 11 for 4 mm sheet glass is shown in FIG. 10. Again it will be seen that a tension peak extends along the selvedge portion removed. In this case the score line 11 occurs in a region of tensile stresses but it will be noted that the stress distribution curve in the selvedge portion passes back into a region of compression between the tension peak and the score line. In this way, the tension peak on the selvedge portion is to some extent balanced by compressive regions on both sides. A high quality of cut edge is again achieved in this example due to little stress redistribution on cutting off the selvedge portions.

In all the above examples the selvedge removal on flat glass is greatly improved by modifying the selvedge area stress distribution prior to snapping. A tension peak is introduced about 25 mm to 75 mm from the edge of the sheet or ribbon so that an overall balanced edge stress is achieved. Furthermore the cutting line is preferably located in a compressive stress trough.

The invention is not limited to the details of the foregoing examples.

The units relevant to the ordinate axes of FIGS. 8, 9 and 10 are nanometers (nm), being the units for relative retardation, an optical observation which is proportional to the principal stress difference at any position on the plate. The retardations were measured by the known Senarmont compensation technique in which plane polarised light was used. This plane polarized light was directed at the specimen and, as a consequence of the birefrigence of stressed glass, split into two planes, corresponding to the principal stresses, upon entry to the glass. The light vibrating in these two planes, passed through the thickness of the specimen resulting in a phase change between the two waves, which was dependent upon the principal stresses existing at each position. This phase change or relative retardation was measured in nanometers. Because of the stress variations through the glass thickness, the retardation is proportional to the diffence between the net values of two stresses averaged through the thickness.

In the particular examples illustrated by FIGS. 8, 9 and 10 the area stress value (i.e., the average principal stress difference) at any position can be calculated in terms of meganewtons per square meter ($MN/m^2$) from the indicated relative retardation in nanometers (nm) by multiplying the relative retardation per millimeter of glass thickness (nm/mm) by a factor of 0.364. Thus, for example, with reference to FIG. 8 which relates to a glass thickness of 10 mm, a relative retardation of 100 nm (along the ordinate axis) represents a principal stress difference of $100/10 \times 0.364 = 3.64$ $MN/m^2$. It is to be understood, however, that these values are given solely by way of illustration and example and are not to be construed as limitative on the scope of the invention.

We claim:

1. A method of cutting a straight, elongated strip from flat, unbent, glass in ribbon or sheet form, which method comprises modifying the stress pattern in the strip region by treating the glass to form in the glass a line of tensile stress along the strip between a substantially straight cutting line and the edge line of the ribbon or sheet which is under compressive stress, and the further step after modifying the stress pattern of causing the glass to fracture along the cutting line while the modified stress pattern still exists by scoring along the cutting line and applying a bending moment across the score line.

2. A method according to claim 1 wherein the modified stress pattern is such that the stress curve passes into compression between said line of tensile stress and the cutting line.

3. A method according to claim 1 in which the step of modifying the stress pattern includes formation of a second line, of compressive stress, along the cutting line.

4. A method according to claim 3 in which the compressive and tensile stresses are such that the energy stored in the strip due to compressive stresses is substantially balanced by the energy stored in the strip due to tensile stresses.

5. A method according to claim 3 in which the second line of compressive stress is formed with the maximum compressive stress substantially coincident with the cutting line.

6. A method according to claim 5 in which the compressive stress is distributed substantially symmetrically on each side of the cutting line.

7. A method according to claim 5 in which the compressive stress has a low stress gradient on each side of the cutting line.

8. A method according to claim 3 in which the compressive and tensile stresses are substantially uniform along the length of the cutting line.

9. A method according to claim 3 in which the compressive and tensile stresses are thermally induced.

10. A method according to claim 9 in which the stresses are introduced during annealing of the glass ribbon or sheet.

11. A method according to claim 9 in which the stresses are introduced after annealing of the glass ribbon or sheet.

12. Apparatus for cutting an elongated strip from flat glass in ribbon or sheet form comprising conveyor means for the flat glass, thermal means for modifying the stress pattern in the strip region to form a line of tensile stress along the strip between a cutting line and the edge of the ribbon or sheet, scoring means for scoring the glass along the cutting line, and fracturing means located downstream of said thermal means as considered in the direction of glass travel for fracturing the glass along the cutting line while the modified stress pattern still exists.

13. Apparatus according to claim 12 in which the fracturing means comprises means to apply a bending moment across a score along the cutting line.

14. Apparatus according to claim 12 comprising an annealing lehr through which the flat glass travels and in which said thermal means is located.

15. Apparatus according to claim 14 including primary thermal means located in a lehr to apply local thermal treatment to said strip region as the glass passes through the lehr, and secondary thermal means located beyond an exit from the lehr to apply local thermal treatment to said strip region after the glass emerges from the lehr.

16. A method of cutting a straight, elongated strip from flat, unbent, glass in ribbon or sheet form, which method comprises scoring along a cutting line, modifying the stress pattern in the strip region by treating the glass to form in the glass a line of tensile stress along the strip between a substantially straight cutting line and the edge line of the ribbon or sheet which is under compressive stress, and the further step after modifying the stress pattern of causing the glass to fracture along the cutting line while the modified stress pattern still exists by applying a bending moment across the score line.

* * * * *